(12) United States Patent
Murphy et al.

(10) Patent No.: US 12,283,176 B2
(45) Date of Patent: Apr. 22, 2025

(54) ILLUMINATED INDICATOR FOR DOORBELL

(71) Applicant: SimpliSafe, Inc., Boston, MA (US)

(72) Inventors: Patrick Lloyd Murphy, Cambridge, MA (US); Gregory Kintz, Santa Cruz, CA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/769,748

(22) Filed: Jul. 11, 2024

(65) Prior Publication Data

US 2024/0371238 A1 Nov. 7, 2024

Related U.S. Application Data

(63) Continuation of application No. 17/672,779, filed on Feb. 16, 2022, now Pat. No. 12,067,862.
(Continued)

(51) Int. Cl.
*G02B 27/09* (2006.01)
*F21V 8/00* (2006.01)
(Continued)

(52) U.S. Cl.
CPC ............ *G08B 3/10* (2013.01); *F21V 33/0056* (2013.01); *G02B 6/0055* (2013.01); *G02B 27/0994* (2013.01); *F21V 2200/13* (2015.01)

(58) Field of Classification Search
CPC . G05G 1/087; G05G 1/10; G05G 1/08; G02B 6/0018; G02B 6/0033; H01H 3/08
See application file for complete search history.

(56) References Cited

U.S. PATENT DOCUMENTS

| | | | |
|---|---|---|---|
| 6,192,774 B1 * | 2/2001 | Bauer | H01H 3/08 16/442 |
| 10,506,205 B2 | 12/2019 | Siminoff et al. | |

(Continued)

FOREIGN PATENT DOCUMENTS

| | | |
|---|---|---|
| CN | 210129268 U | 3/2020 |
| DE | 102 25 016 A1 | 1/2004 |

(Continued)

OTHER PUBLICATIONS

International Search Report and Written Opinion for International Application No. PCT/US2022/016684, mailed Jul. 15, 2022.
(Continued)

*Primary Examiner* — Omar Rojas Cadima
(74) *Attorney, Agent, or Firm* — Wolf, Greenfield & Sacks, P.C.

(57) ABSTRACT

An illuminated indicator for a doorbell can be arranged to receive light along an optical axis (e.g., that is perpendicular to a front face of the doorbell housing) and emit the light from an output portion that defines a closed loop (e.g., that extends around the optical axis) and in a direction that is parallel to the optical axis. The illuminated indicator can include a light pipe that receives light along the optical axis and reflects the light to follow a radially outward and divergent path, e.g., that is perpendicular to the optical axis. The radially outward and divergent light can be reflected to follow a path that is parallel to the optical axis for emission at an output portion of the light pipe. The light pipe can be configured to transmit a doorbell switch activation force to other parts of the doorbell to cause actuation of the switch.

25 Claims, 8 Drawing Sheets

Related U.S. Application Data (60) Provisional application No. 63/151,244, filed on Feb. 19, 2021.

(51) Int. Cl.
  *F21V 33/00* (2006.01)
  *G08B 3/10* (2006.01)

(56) References Cited

U.S. PATENT DOCUMENTS

| | | | |
|---|---|---|---|
| 10,708,472 | B2 | 7/2020 | Jeong et al. |
| 12,067,862 | B2 * | 8/2024 | Murphy ................. H01H 9/182 |
| 2002/0075668 | A1 | 6/2002 | Dorrie |
| 2006/0108210 | A1 * | 5/2006 | Katayama ............ H01H 13/023 |
| | | | 200/296 |
| 2016/0330403 | A1 | 11/2016 | Siminoff |
| 2022/0270450 | A1 | 8/2022 | Murphy et al. |

FOREIGN PATENT DOCUMENTS

| | | | |
|---|---|---|---|
| EP | 1 467 387 A1 | 10/2004 | |
| GB | 2435937 A * | 9/2007 | ............. B60Q 3/004 |
| WO | WO 2008/128516 A1 | 10/2008 | |

OTHER PUBLICATIONS

International Preliminary Report on Patentability for International Application No. PCT/US2022/016684, mailed Aug. 31, 2023.

* cited by examiner

ILLUMINATED INDICATOR FOR DOORBELL

RELATED APPLICATION

This Application is a Continuation of U.S. application Ser. No. 17/672,779, filed Feb. 16, 2022, which claims priority under 35 U.S.C. § 119 (e) to U.S. Provisional Application Ser. No. 63/151,244, filed Feb. 19, 2021. The entire contents of these applications are incorporated herein by reference in their entirety.

TECHNICAL FIELD

This application relates to an illuminated indicator, e.g., for use to indicate a doorbell button.

BACKGROUND

Doorbells are commonly used to monitor a location near a door into a building as well as allow a visitor to announce their presence. Such doorbells are often mounted to a wall near the entry point. In many cases, doorbells have a button that can be pressed by a visitor, which activates a chime or other indication to a person inside or otherwise monitoring the building entry.

SUMMARY OF INVENTION

An illuminated indicator can provide illumination for a doorbell portion, such as a button or pressing area of the doorbell, that is concentrated, bright and/or uniform, and thereby provide a pleasing appearance that draws a visitor's attention to the location of the doorbell. In some aspects, light pipes and light dispersion techniques are described herein that include an ability to direct light within an illuminated indicator from one light reflecting surface or emitting device outward radially toward light directed outward radially from other light reflecting surfaces or emitting devices. The radially outwardly directed light from multiple light reflecting surfaces and/or emitting devices can provide a light mixing or homogenization function that provides a suitably even or uniform light at a light output surface of the illuminated indicator, potentially allowing for the use of fewer light emitting devices than might otherwise be used to generate a similar light output. As a result, the light pipes and light dispersion techniques described herein can, in some cases, reduce the design complexity and costs of devices in which they are used by reducing part counts while maintaining suitably even, uniform, bright or otherwise desirable light output. In some aspects, light emitting devices and light pipes are described that ease manufacturing and assembly tolerances by directing light from a light emitter to a light pipe in a way that permits only rough positioning or alignment of the elements with respect to each other. For example, a light pipe can be configured to receive light over a relatively large area so as to allow the light pipe to be positioned in an approximate way over one or more light emitting devices and yet still optically couple the light emitting devices with the light pipe appropriately.

In some examples, an illuminated indicator for use with a doorbell, e.g., to indicate a doorbell button press area, includes one or more light emitting devices each configured to emit light in a direction along an optical axis and a light pipe having an input portion configured to receive light from the one or more light emitting devices directed along the optical axis. The light pipe can have an output portion configured to emit the light received at the input portion and can have one or more light reflecting portions optically between the input portion and the output portion. The one or more light reflecting portions can be configured to receive light from the input portion in the direction along the optical axis and reflect the light to travel along a radially outward and divergent path that is transverse to the optical axis. This arrangement can provide various benefits such as homogenizing or otherwise uniformizing light output at the output portion and/or easing manufacturing and/or assembly tolerances for the illuminated indicator. For example, multiple light emitting devices need not be precisely aligned relative to the light pipe to provide light to the input portion, but instead can be more generally arranged to emit light in a common direction toward a relatively large input face of the light pipe.

In some examples, the one or more light reflecting portions each include a surface of the light pipe having a partial frusto-conical shape, partial spherical shape, partial cylindrical shape, or other. When a frusto-conical shape is employed, a longitudinal axis of the partial frusto-conical shape can be parallel to the optical axis and the partial frusto-conical surface can taper outwardly in a direction along the optical axis and away from the one or more light emitting devices.

In some examples, the indicator includes a plurality of light emitting devices and a plurality of light reflecting portions, where each light reflecting portion is configured to receive light from a corresponding light emitting device and to reflect the light to travel along a corresponding radially outward and divergent path. The radially outward and divergent paths for at least two light reflecting portions can overlap, which can help the light pipe make more uniform the light that is emitted at the output portion. In some cases, the radially outward and divergent paths for adjacent light reflecting portions overlap with each other.

In some examples, the radially outward and divergent path for each light reflecting portion spans an arc of 20 degrees to 180 degrees.

In some examples, the light pipe includes a disc-shaped portion, and the one or more light reflecting portions are arranged at a center of the disc-shaped portion. For example, a plurality of light reflecting portions can be arranged around an opening in the disc-shaped portion. In some cases, a plurality of light reflecting portions can be configured to receive light in a direction perpendicular to a plane of the disc-shaped portion and to reflect the light to travel along a direction radially outward within the disc-shaped portion. In some examples, the light pipe includes an annular ring extending axially from a periphery of the disc-shaped portion and that defines the output portion.

In some examples, a plurality of light emitting devices can be arranged in a circular emitter array, and a plurality of light reflecting portions can be arranged in a circular reflector array that has a same size as the circular emitter array. The circular reflector array can be spaced from the circular emitter array and arranged in a plane that is parallel to a plane of the circular emitter array. The plurality of light reflecting portions can be configured to reflect the light to travel along a path that is radially outward and divergent from the circular reflector array. The light pipe can be configured to emit the light at the output portion in a direction perpendicular to the plane of the circular reflector array.

In some examples, the light pipe is configured to receive and transmit a doorbell switch activation force to cause actuation of a doorbell switch.

In some examples, an illuminated indicator for use with a doorbell button includes one or more light emitting devices each configured to emit light in a direction along an optical axis and a light pipe having an input portion configured to receive light from the one or more light emitting devices directed along the optical axis. An output portion can be configured to emit the light in an output direction that is parallel to and spaced from the optical axis, and the output portion can be configured to emit the light from a region of the output portion that defines a closed loop. As an example, the closed loop can have a circular shape, although other shapes are possible. In some cases, a user pressable button for actuation of a doorbell switch can be located inside of the closed loop. Thus, the indicator can visually indicate to a user where a doorbell should be pressed to actuate a doorbell switch.

In some cases, the optical axis is configured to pass through an interior of the closed loop, e.g., the light pipe can receive light in an area that is within the closed loop where the light is output. In some examples, the light pipe can be configured to reflect light received along the optical axis to travel along a radially outward and divergent path that is perpendicular to the optical axis. For example, the light pipe can receive light in an annular area that has a first diameter and emit the light from the closed loop which has a second diameter larger than the first diameter.

In some examples, the light pipe and light emitting devices can be arranged having any of the features described above, e.g., the light pipe can include a plurality of light reflecting portions that are each configured to receive light from a light emitting device and to reflect the light to travel along a radially outward and divergent path that is perpendicular to the optical axis.

In some examples, a method for operating a doorbell includes emitting light from one or more light emitting devices in a direction along an optical axis, receiving the light at an input portion of a light pipe and conducting the light in the light pipe in the direction along the optical axis. Light conducted along the optical axis can be reflected to travel in the light pipe along a radially outward and divergent path that is transverse to the optical axis. For example, light can be reflected by one or more surfaces having a partial frusto-conical shape. In some cases, the light can be homogenized for emission from an output portion of the light pipe. For example, the light can be reflected to travel along multiple radially outward and divergent paths, where at least two of the radially outward and divergent paths overlap. This overlapping of radially outward paths can help homogenize the light for output from the light pipe, e.g., to provide a more uniform light emission. The light traveling along a radially outward and divergent path can be reflected to travel in a direction along and spaced from the optical axis.

In some examples, a method for operating a doorbell includes emitting light from one or more light emitting devices in a direction along an optical axis, and receiving the light at an input portion of a light pipe and conducting the light in the light pipe in the direction along the optical axis. The light can be emitted from a region of an output portion of the light pipe that defines a closed loop and in an output direction that is parallel to and spaced from the optical axis. In some cases, the closed loop has a circular shape. In some examples, the light is emitted from a closed loop that extends around a user pressable button for actuation of a doorbell switch. The light can help a visitor identify a doorbell press area, e.g., in low light conditions. In some cases, the optical axis passes through an interior of the closed loop, e.g., light can be emitted in a forward direction at a center region of the closed loop and be emitted from the closed loop in the forward direction at a radially outward location relative to the optical axis. In some examples, the light is homogenized in the light pipe.

Other advantages and novel features will become apparent from the following detailed description of various non-limiting examples when considered in conjunction with the accompanying figures and claims.

BRIEF DESCRIPTION OF THE DRAWINGS

Aspects of the systems and methods described herein are described with reference to the following drawings in which numerals reference like elements, and wherein.

DETAILED DESCRIPTION

Aspects of the systems and methods described herein are described below by way of one or more illustrative examples. It should be understood that the illustrative examples described are not intended to limit the aspects, but rather to help show how one or more aspects can be implemented in particular examples. Also, aspects can be implemented alone and/or in any suitable combination with other aspects. For example, some aspects below relate to an illuminated indicator for a doorbell that can receive light along an optical axis and emit light from an output portion that defines a closed loop and in a direction that is parallel to and spaced from the optical axis. Some aspects below relate to an illuminated indicator that can receive light along an optical axis and reflect the light to follow a radially outward and divergent path that is transverse (e.g., perpendicular) to the optical axis. Some aspects below relate to a light pipe for an illuminated indicator that can receive and output light in a desired way (e.g., to indicate where to press the doorbell to actuate a doorbell switch) and which can be configured to transmit force of a user pressing on the light pipe (directly or indirectly) to a portion of the doorbell to actuate a doorbell switch. These aspects and others can be employed together, individually and/or in any suitable sub combination with each other, e.g., a light pipe can be arranged to reflect light to follow a radially outward and divergent path but not be configured to transmit a switch actuation force, or a light pipe can be configured to transmit a switch actuation force but not be configured to reflect light in any particular way or to receive and emit light along parallel paths.

In some aspects, a doorbell includes a mount configured to be secured to a surface and support the doorbell on the surface. For example, the mount can be arranged to be secured to a wall, doorjamb or casing, window, or other surface using screws or other fasteners, adhesive, welding, etc. A housing of the doorbell can be attached to the mount and can include one or more components to provide doorbell functions. For example, the housing can have a switch configured to be actuated to provide an indication of actuation of the doorbell, such as by a visitor pressing a button or other portion of the housing to actuate the switch. The indication of doorbell actuation can be used to perform various functions, such as activating an audible and/or visual chime or other indication that the doorbell switch has been actuated. In some examples the doorbell housing can include other components, such as a camera or other imaging device to image an area near the doorbell, a motion sensor to detect motion near the doorbell, a speaker for producing audible sound, a microphone for receiving and transmitting a signal indicative of sound at or around the doorbell, wireless and/or wired communications devices for sending and receiving signals regarding sensed conditions at the doorbell, a controller to generate control signals for the doorbell or other devices, a user interface to receive and present information to a user (e.g., visually and/or audibly) by the doorbell, a battery or other power source, and so on. Thus, with the housing secured to the mount on a wall or other surface, the doorbell housing can perform various functions suitable for a doorbell, such as allowing a visitor to announce their presence at a building door or other access area, allowing a user to communicate audibly and/or visually with a visitor via a camera/display/speaker/microphone, allowing a user to monitor activity in an area near the doorbell (via recorded sound and/or video), and so on.

In some aspects, a doorbell can include an illuminated indicator, e.g., to indicate where a visitor should press on the doorbell housing to actuate a doorbell switch. An illuminated indicator can be particularly useful at night or other low light conditions to aid a visitor in identifying not only where a doorbell is located but also where to press on the doorbell to operate the doorbell to provide an indication of their arrival, e.g., by actuating a doorbell chime or other notification to people inside a building or otherwise monitoring an entry by way of the doorbell. In some cases, a portion of the illuminated indicator such as a light pipe can receive and transmit the doorbell switch actuation force to other parts of the doorbell housing. In some examples, a light pipe can receive and operate on light so the light is output in a desired way. For example, a light pipe can be configured to receive light along an optical axis, e.g., in a direction that is perpendicular to and away from a surface to which the doorbell is mounted, and to output the light at an output portion that defines a closed loop and in a direction that is parallel to and spaced from the optical axis. In some examples, a light pipe can receive light along an optical axis and reflect the light to follow a radially outward and divergent path. These configurations can help homogenize or uniformize the light that is output by the light pipe as well as help spread the light over an output region of a desired size and/or shape. In addition, or alternately, these arrangements can significantly ease tolerances regarding positioning, manufacture and/or assembly of the light pipe and light emitting devices.

Figure 1:
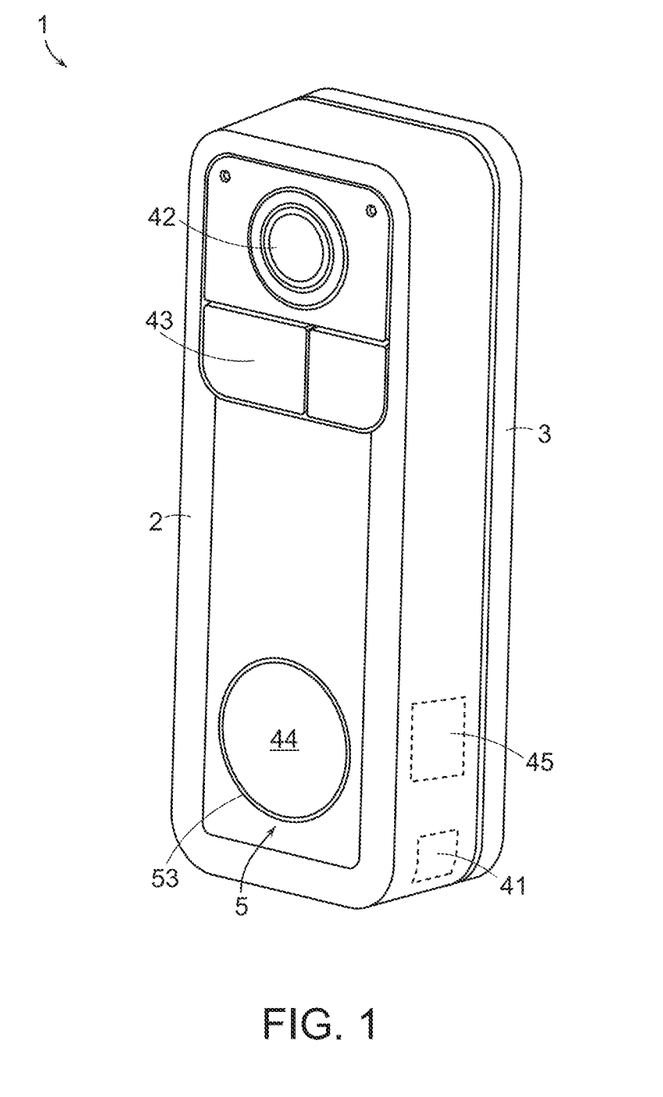
FIG. 1 is front lower right perspective view of a doorbell having an illuminated indicator in an illustrative example.

FIG. 1 shows an illustrative example of a doorbell 1 that includes a housing 2 and a mount 3. In some examples, the housing 2 can include components for performing functions for the doorbell 1, such as a microphone and speaker 41, a camera or other imaging device 42, a motion sensor 43, a button or press area 44 that a visitor can press to cause an indication that the doorbell switch has been actuated, an illuminated indicator 5 that is associated with the press area 44, and so on. Operation of such components can be controlled by a controller 45, which can include a computer or other data processing unit configured to perform various functions such as causing the camera 42 to capture video and/or still image data, the microphone and speaker 41 to record and/or present audible sound, communicate with devices remote from the doorbell 1 (such as a user phone or other device to allow a user to observe and communicate with a visitor), actuate a chime or other device to indicate that a user has pressed the button 44, store sensed condition data such as sound, video, motion, etc. and other functions. These and/or other components can be housed at least partially within the housing 2, e.g., such that the doorbell 1 can perform all, most or many of its functions whether attached to the mount 3 or not. In some examples, the housing 2 can be configured to perform all of its functions without being engaged with the mount 3.

In some examples, the mount 3 can be configured to be secured to a wall or other surface and so support the housing 2 on the wall or other surface. For example, the mount 3 can have a front side that is positioned adjacent the rear side of the housing 2 when the housing 2 is engaged with the mount 3, but is exposed when the housing 2 is removed from the mount 3. With the front side of the mount exposed, the mount 3 can be secured to a surface, such as by engaging a screw or other fastener with one or more openings in the mount 3 to secure the mount 3 to a wall or other surface. Other arrangements can be employed to secure the mount 3 to a surface, such as adhesive, welding, magnets, etc. The housing 2 can be secured to the mount 3 in any suitable way, such as by spring tabs, bayonet connections, snap fit, fasteners, and so on.

In some aspects, the illuminated indicator 5 is configured to output light from a region of an output portion that defines a closed loop. For example, FIG. 1 shows an output portion 53 of the illuminated indicator 5 that has an annular shape and extends around the button or press area 44. By emitting illumination in a region around the button or press area 44, the illuminated indicator 5 can direct a visitor to press on the doorbell housing 2 in the press area 44 inside of the illuminated region. In some examples the closed loop defined by the output portion 53 has a circular or annular shape as shown in FIG. 1. In some examples the closed loop has a polygonal (triangular, square, etc.), oval, elliptical, irregular or other suitable shape.

Figure 2:
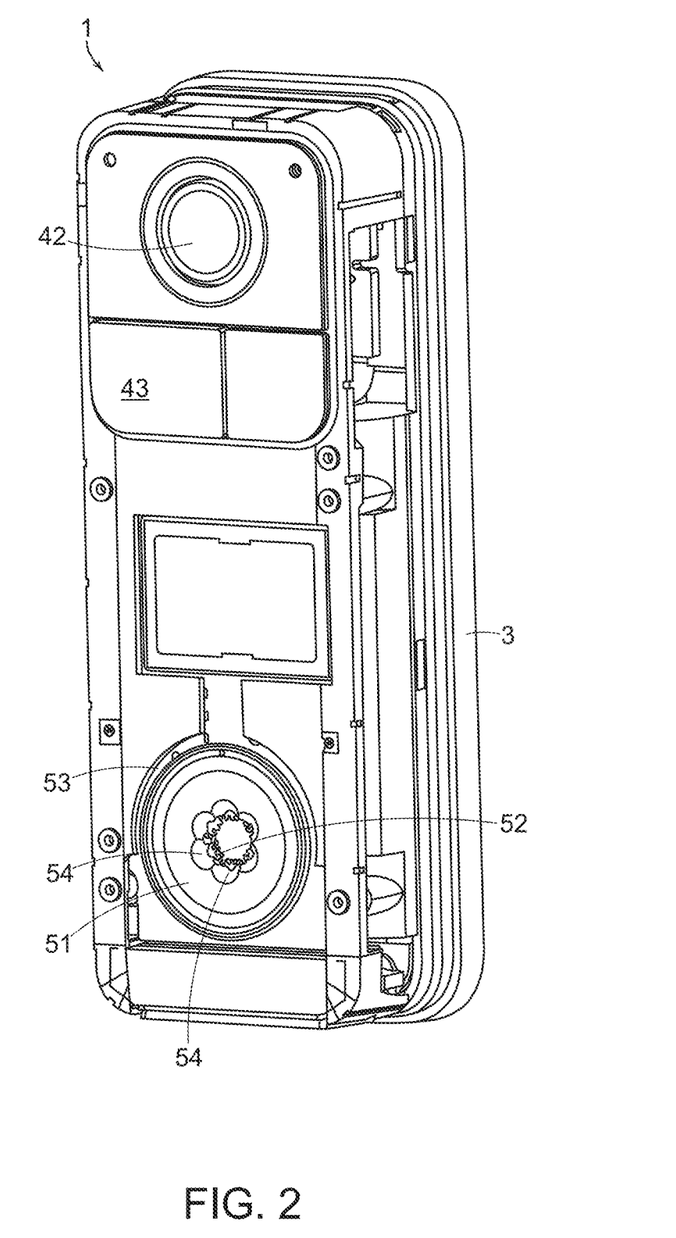
FIG. 2 is a view of the FIG. 1 doorbell with a housing portion removed to reveal a light pipe of the illuminated indicator.
Figure 3:
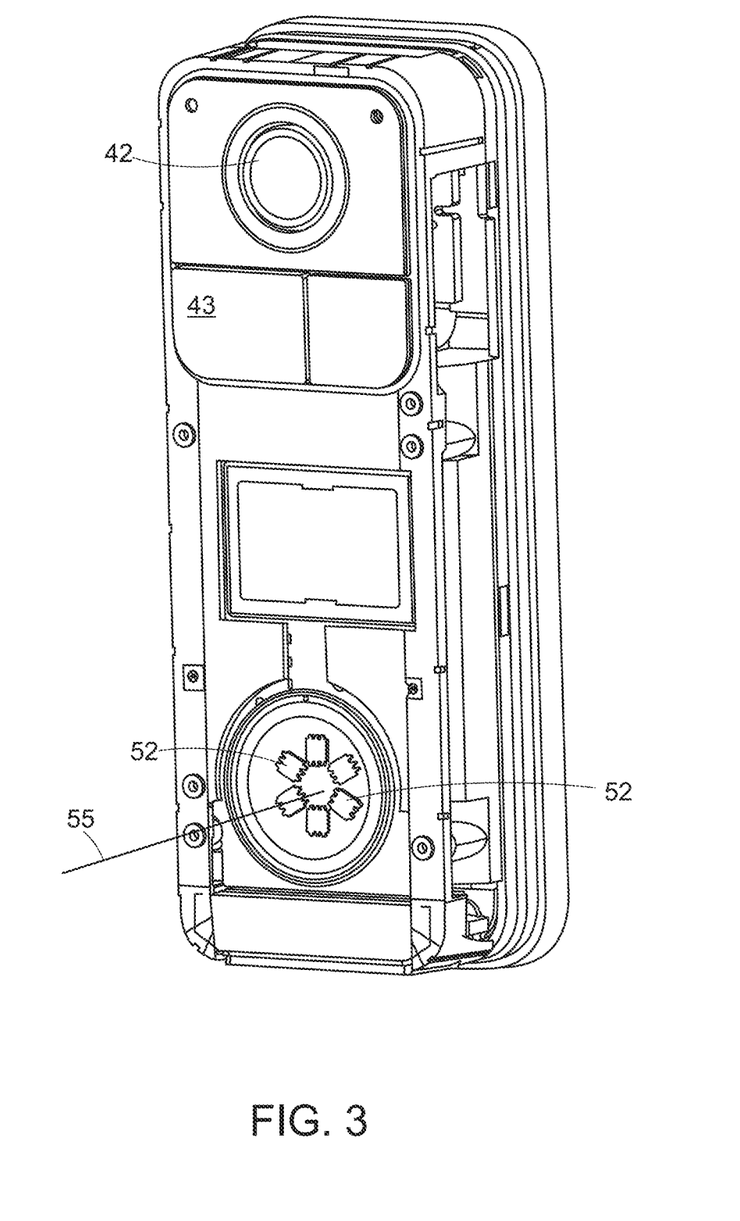
FIG. 3 is a view of the FIG. 1 doorbell with the light pipe of the illuminated indicator removed.

FIG. 2 shows the doorbell 1 with an outer portion of the housing 2 and a part of the press area 44 removed to reveal a light pipe 51 and light emitting devices 52 of the illuminated indicator 5. In some examples, the press area 44 is an opaque disc or other element that is received in a recess at a front side of the light pipe 51. In some examples, the press area 44 can be made integrally or unitarily with the light pipe 51, e.g., by co-molding, adhesive, etc., and can be fixed relative to the light pipe 51. In some examples, the press area 44 is translucent or transparent and may transmit light from the light emitting devices 52. FIG. 3 shows the doorbell 1 with the light pipe 51 removed to show an array of the light emitting device 52. The light emitting devices 52 are configured to emit light which is received by the light pipe 51 and emitted at the output portion 53 of the light pipe 51. In some examples, the light emitting devices 52 can be arranged in a circular array as shown in FIG. 3, e.g., with six light emitting devices arranged in a circular pattern. In some examples, the light emitting devices 52 can be arranged in any suitably shaped array such as square, triangular, irregularly shaped, etc. In some examples, a single light emitting device can be used rather than two or more. The light emitting devices 52 can each be arranged to emit light over an area, e.g., to emit a beam of light having a cross sectional area having a size and/or shape taken in a direction perpendicular to the direction of propagation. For example, light emitting devices 52 can emit a beam of light having a circular or rectangular cross sectional shape having an area of 1 sq. mm to 100 sq. mm or more.

In some examples and as can be seen in FIG. 2, the light pipe 51 includes one or more light reflecting portions 54 that receive light, e.g., a beam of light, from a light emitting device 52. In some cases, each light reflecting portion 54 corresponds to a respective light emitting device 52. In some cases, a light reflecting portion 54 can receive light from two or more light emitting devices 52. In some examples, a circular reflector array of the light pipe 51 can be spaced from or positioned over or in front of a circular light emitter array and be arranged in a plane that is parallel to a plane of the circular light emitter array. For example, a plurality of light reflecting portions 54 can be arranged in a circular array as shown in FIG. 2 and be arranged in a plane that is parallel to a plane in which the circular array of light emitting devices 52 is arranged. In some cases, the light pipe 51 can be configured to emit light at the output portion 53 in a direction perpendicular to the plane of the circular reflector array and/or the circular array of light emitting devices 52. One-to-one correspondence between light emitting devices 52 and light reflecting portions 54 is not required. In some examples two or more light reflecting portions 54 can correspond to one light emitting device 52, or two or more light emitting devices 52 can correspond to one light reflecting portion 54. As an example, a single light emitting device 52 can emit light that is received and operated on by an array of light reflecting portions 54, such as the six light reflecting portions 54 in FIG. 2. The light emitting devices 52 can be light emitting diodes or other light emitters and can be mounted on a printed circuit board (PCB) or other support that is mounted within the housing 2. The light pipe 51 can be secured to the printed circuit board or to another portion of the housing 2.

In some aspects, the light pipe 51 has an input portion configured to receive light from the one or more light emitting devices 52 directed along an optical axis, and an output portion 53 configured to emit the light in an output direction that is parallel to and spaced from the optical axis. As noted above, the output portion 53 can be configured to emit the light from a region of the output portion 53 that defines a closed loop, e.g., that extends around a press area or button 44. In some examples, the light emitting devices 52 can emit light along an optical axis 55 (see FIG. 3) that is perpendicular to a front side or face of the housing 2 and/or perpendicular to a PCB or other support to which the light emitting devices 52 are mounted and/or perpendicular to a surface to which the doorbell 1 is mounted. Light from the light emitting devices 52 can be received by the light pipe 51 at an input portion 58 that is positioned over the light emitting devices 52 and/or in a direction along the optical axis 55 from the light emitting devices 52. The light pipe 51 can operate on the light, e.g., by internal reflection, to direct the light to the output portion 53 where the light is emitted in a direction that is parallel to and spaced from the optical axis along which the light emitting devices emit light. In some cases, the region where the output portion 53 outputs the light can extend around the optical axis 55. This arrangement can ease tolerances in the manufacture and assembly of the illuminated indicator 5 because an input portion 58 of the light pipe 51 need not be precisely aligned with a light emitting device 52, as can be the case with arrangements that have a light emitting diode direct light radially outwardly into the inner edge of a disc-shaped element. In the example of FIG. 2, for example, the light pipe 51 need only be generally positioned over the light emitting device 52 array and precise positioning or sizing is not required to properly direct light into the light pipe 51. This arrangement can also allow light emitting devices 52 to emit light into a press area or button 44 as well as into the light pipe 51, e.g., where the press area or button 44 is transparent or translucent and arranged to emit light as well as the light pipe 51, because the light emitting devices 52 can be arranged to emit light directly toward the button 44. Another advantage provided by this arrangement is that the light emitting devices 52 can be configured to include multiple emitting elements, each that emit a different color light from a different area of the light emitting device 52. As an example, the light emitting devices can be configured to have red, green and blue emitting portions that are distinct from each other and emit from a different location of the light emitting device 52. Since the light pipe 51 is configured to receive light from a relatively wide area at the input portion 58, different colored light can be received and emitted at the output portion of the light pipe 51 in a uniform and bright fashion regardless of the color output.

Figure 7:
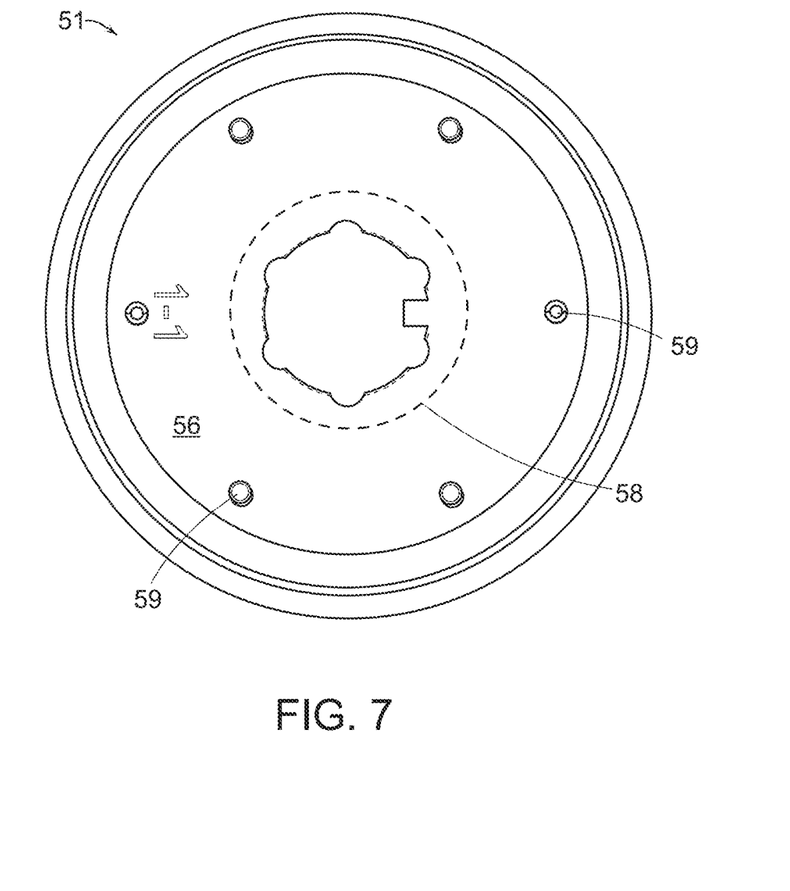
FIG. 7 is a rear view of the FIG. 4 light pipe.

FIGS. 4-7 show front, perspective, cross sectional, and rear views, respectively of the light pipe 51 in the FIGS. 1-3 example. In some examples, the light pipe 51 includes a disc-shaped portion 56, and a plurality of light reflecting portions 54 arranged at a center of the disc-shaped portion 56. For example, in some cases a plurality of light reflecting portions 54 are arranged around an opening in the disc-shaped portion 56, although such an opening is not required. The light reflecting portions 54 are configured to receive light in a direction perpendicular to a plane of the disc-shaped portion 56 and to reflect the light to travel along a direction radially outward within the disc-shaped portion 56. For example, in some examples the light pipe 51 has an input portion 58 that is an area of the rear side of the disc-shaped portion 56 as can be seen in FIG. 7. Since the input portion 58 is relatively large compared to the light emitting devices 52, the light pipe 51 need only be positioned in an approximate way over the light emitting devices 52 to ensure that light is properly received at the input portion 58. Posts 59 or other elements on the rear side of the light pipe 51 can help orient the light pipe 51 relative to the light emitting devices 52, e.g., the posts 59 can contact a PCB or other support on which the light emitting devices 52 are mounted and thereby space the input portion 58 appropriately from the light emitting devices 52 in a direction along the optical axis 55 as well as orient the light receiving face of the input portion 58 (e.g., to be perpendicular to the optical axis 55). As discussed more below, the posts 59 can also transmit a pressing force on the button 44 to another portion of the housing 2 to activate a doorbell switch, e.g., without applying the activation force to the light emitting devices 52.

Figure 4:
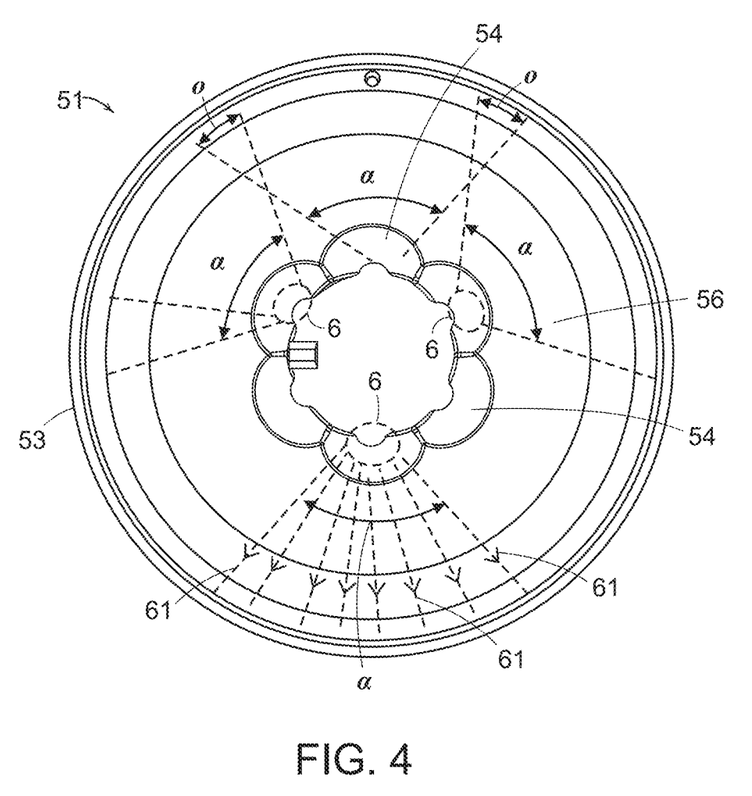
FIG. 4 is a front view of a light pipe for an illuminated indicator in an illustrative example.
Figure 5:
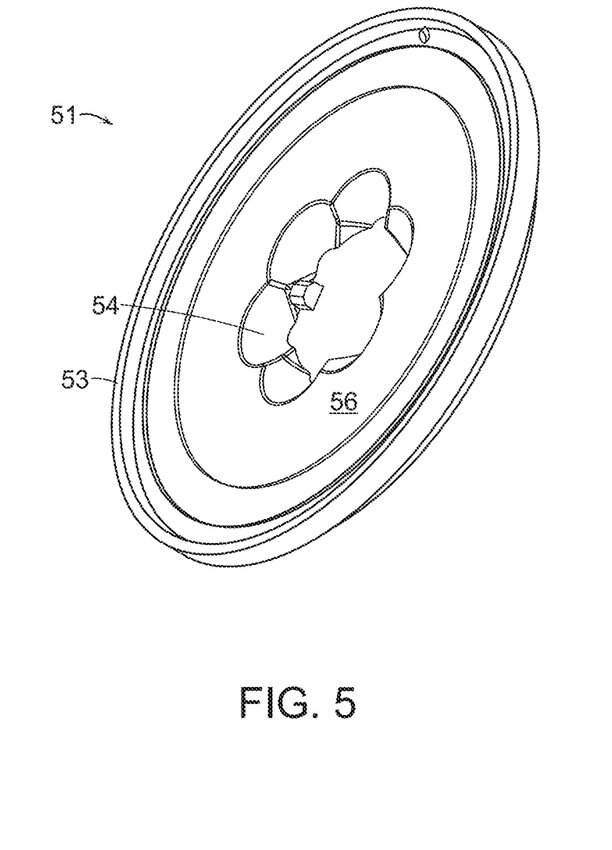
FIG. 5 is a perspective view of the FIG. 4 light pipe.
Figure 6:
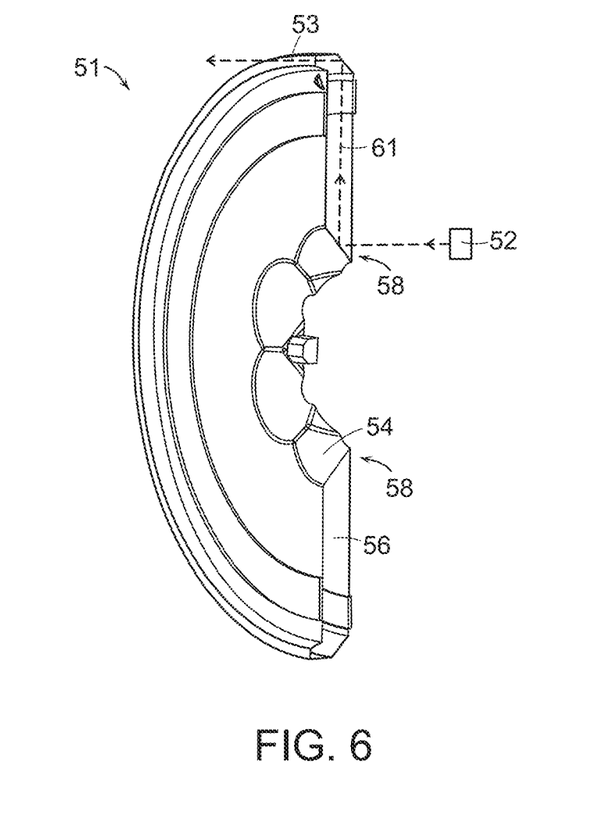
FIG. 6 is a sectional view of the FIG. 4 light pipe.

In some examples, light (e.g., a light beam) received at the input portion 58 travels in the light pipe 51 along the optical axis 55 to a light reflecting portion 54 which reflects the light received along the optical axis 55 to travel along a radially outward and divergent path that is perpendicular to the optical axis 55. For example, as illustrated by the dashed line in FIG. 6, a light ray 61 included with light from a light emitting device 52 is received by the input portion 58 of the light pipe 51 in a direction along the optical axis 55 and is reflected by a light reflecting portion 54 to travel along a radially outward path, e.g., toward the periphery of the disc-shaped portion 56. The radially outward path can be perpendicular to the optical axis 55 in some examples. The light ray 61 is reflected again at the peripheral edge of the disc-shaped portion 56 to travel in a direction parallel to the optical axis 55 and be emitted by the output portion 53. As can be seen in FIG. 4 and will be understood by those of skill in the art, a light emitting device 62 emits multiple light rays 61 over an area to form a beam having a cross sectional area taken in a direction perpendicular to the direction of propagation, and the light rays 61 of the beam can be received over an area 6 of the light reflecting portions 54. Since in this example the area 6 of the light reflecting portion 54 that is illuminated by the rays 61 of the beam has a suitably arranged shape, the light rays 61 are reflected by the light reflecting portion 54 to collectively travel along a radially outward and divergent path with respect to each other. In other words, light received by each light reflecting portion is reflected to follow a radially outward and divergent path, e.g., to form a beam or collection of light rays that is divergent and directed radially outwardly. In some examples, the radially outward and divergent path for each light reflecting portion 54 spans an arc α of 20 degrees to 180 degrees (e.g., 60 degrees to 150 degrees, or 80 degrees to 120 degrees). In some examples, the radially outward and divergent paths associated with two or more light reflecting portions 56 overlap with each other as can be seen in FIG. 4 as well. The extent of overlap O between divergent light paths can be configured to be any suitable extent, e.g., spanning an arc of 0 to 60 degrees or more. Arranging light from the light emitting devices and/or light reflecting portions to travel a divergent path and/or paths that overlap to at least some extent can help homogenize or uniformize light that is emitted at the output portion 53. That is, light emitted at the output portion 53 can be more even or uniform in luminosity or intensity, e.g., so that light emitted at all parts of the output portion 53 have an intensity that is within 20 to 30% of each other. Such homogenization or uniformization can be provided or enhanced by other features as well, such as light scattering elements or surfaces, lenses, etc. In some examples, the input portion 58 can have an area that receives light from the light emitting devices 52 that is larger than the output portion 53, e.g., a ratio of the light receiving input portion 58 to the light emitting output portion 53 can be 1.2 to 5. This arrangement can concentrate light that is received at the input portion 58 for emission at the output portion 53, particularly if 90% or more of light that enters the light pipe 51 is emitted at the output portion 53. This concentration of light can also aid in homogenizing or uniformizing the light output at the output portion 53.

Figure 8:
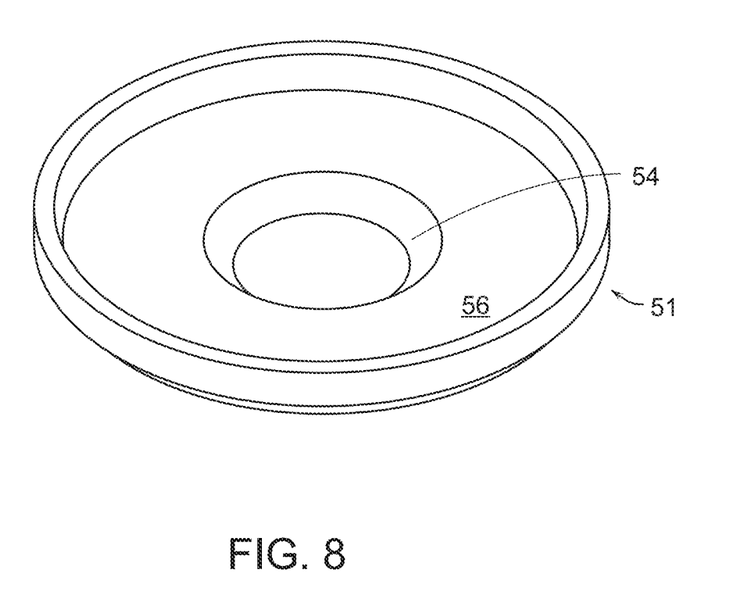
FIG. 8 shows a light pipe having a single light reflecting portion.
Figure 9:
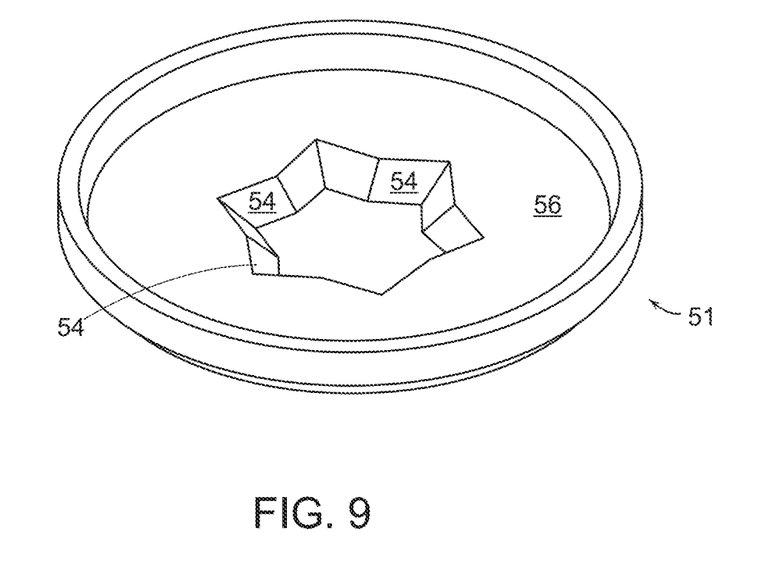
FIG. 9 shows a light pipe having multiple, planar light reflecting portions.

In some examples, the light reflecting portions 56 can direct light to follow a radially outward and divergent path by employing light reflection surfaces that have a particular shape. For example, in some examples, the light reflecting portions 54 each include a surface of the light pipe that has a partial frusto-conical shape. In some cases, a longitudinal axis of the partial frusto-conical shape is parallel to the optical axis 55, and/or the partial frusto-conical surface can taper outwardly in a direction along the optical axis 55 and away from the one or more light emitting devices 52. In some examples, the partial frusto-conical surfaces can have a half angle of 30 degrees to 60 degrees, e.g., about 45 degrees. The reflecting function can be provided by a differential in index of refraction (e.g., at an air/plastic interface between the light pipe 51 at the light reflecting portions 54), a reflective material (such as an aluminum or other layer at a reflective surface of the light reflecting portions 54), or other optical feature. The use of partial frusto-conical surfaces is not required for the light reflecting portions 54, and other shapes can be used instead. In some examples, the light reflecting portions 54 can include surfaces having a partial spherical shape, a partial conical shape, a partial cylindrical shape, a parabolic shape, and/or any other suitably curved or configured shape to reflect light in a desired way, e.g., in a radially outward and divergent way. For example, FIG. 8 shows an illustrative light pipe 51 that has a single light reflecting portion 54 that defines a single frusto-conical or chamfered surface at an opening of a disc-shaped portion 56. FIG. 9 shows another illustrative light pipe 51 that includes multiple, planar light reflecting portions 54 arranged in a star pattern at an opening of a disc-shaped portion 56. Collectively, the light reflecting portions 54 reflect light to follow a radially outward and divergent path. Note that an area 6 of the light reflecting portions 54 that is illuminated can be any suitable shape and/or size, e.g., an entire surface area of a light reflecting portion 54 can be illuminated, or only a portion of a light reflecting portion 54. Also, where light emitting devices 52 have distinct emission portions, e.g., for different color light, each emission portion can illuminate a differently positioned, sized and/or shaped area 6 of a reflecting portion 54, and yet light output by the light pipe 51 can be uniform and bright across different colored light.

In some examples, the light pipe 51 includes an annular ring extending axially from a periphery of the disc-shaped portion 56 and that defines the output portion 53. The annular ring can help define how light is output from the output portion 53, e.g., to travel in a direction parallel to the optical axis 55. In some examples, a distal surface of the annular ring can be positioned flush or at a same level as surrounding parts of the housing 2 on the front face of the housing 2. In some examples, the distal surface of the annular ring can be positioned flush or at a same level as the press area or button 44 inside of the annular ring. This flush configuration of the housing/annular ring/button can provide a smooth front surface without noticeable or physically distinguishable discontinuities for the housing 2, and can reduce or eliminate any need for the press area or button 44 to protrude or be recessed with respect to the front face portions of the housing 2 around the button 44. As an example, the distal surface of the annular ring or other output surface of the light pipe can be positioned within 1 mm or less of an adjacent portion of the housing 2 and/or button 44. As a result, the annular ring or other output portion 53 alone can indicate an area where the visitor should press to actuate the doorbell switch.

As mentioned above, in some examples the light pipe 51 is configured to receive and transmit a doorbell actuation force to other elements of the doorbell to cause a switch to be actuated. For example, the press area or button 44 can be fixed to the light pipe 51 and arranged so that when a visitor presses on the button 44, the button 44 transmits the force to the light pipe 51. In turn, the light pipe 51 can transmit the force to a switch, e.g., positioned on the PCB that the light emitting devices 52 are mounted to or elsewhere, either directly or indirectly. In some examples, the light pipe 51 can transmit the force to a frame or other structural element of the housing 2 so that the entire housing 2 is moved relative to the mount 3. Such movement of the entire housing 2 can cause actuation of a doorbell switch. For example, in some examples the housing 2 can be mounted to the mount 3 so that the housing 2 can move relative to the mount 3 in response to a user pressing on the button 44 (which can be fixed relative to the housing 2 and the light pipe 51). A doorbell switch (not shown) can be arranged in a space between a rear side of the housing 2 and the mount 3 and configured so that when the housing 2 is moved toward the mount 3 in response to a user pressing the button 44, the switch is actuated. Such actuation can occur by a portion of the mount 3 contacting the switch as the housing 2 and switch move toward the mount 3. Thus, the light pipe 51 can receive a switch activation force from a user (via the button 44) and transmit the force to the housing 2 to cause actuation of the switch. The light pipe 51 can be fixed relative to the button 44 and other parts of the housing 2, and thus a front face of the doorbell 1 can have no moving parts such as a doorbell switch or associated button.

As noted above, operation of the doorbell components can be controlled by the controller 45, which can include a programmed processor and/or other data processing device along with suitable software or other operating instructions, one or more memories (including non-transient storage media that can store software and/or other operating instructions), sensors, input/output interfaces (such as a user interface on the housing), communication modules, buses or other links, a display, switches, relays, triacs, a battery or other power source or supply, or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

While systems and methods have been described with reference to various illustrative examples, such systems and methods are not limited to the examples described. Thus, it is evident that many alternatives, modifications, and variations of the examples described will be apparent to those skilled in the art. Accordingly, examples as set forth herein are intended to be illustrative, not limiting.

The invention claimed is:

1. A device comprising:
a housing having an outer surface;
an emitter to output light in a direction along an optical axis, the emitter supported by the housing; and
a light pipe to receive light from the emitter, the light pipe including a plurality of light reflecting portions positioned between an input portion and an output portion defined by an annular ring of the light pipe, and the plurality including a first light reflecting portion having a continuously curved shape to reflect light in an overlapping fashion with light reflected by second and third light reflecting portions of the plurality,
wherein a distal end of the annular ring is positioned flush or at a same level as surrounding parts of the housing at the outer surface.

2. The device of claim 1, wherein the emitter includes a plurality of light emitting devices and wherein the light pipe is configured to homogenize light from the plurality of light emitting devices for emission from the output portion.

3. The device of claim 1, wherein the first light reflecting portion includes a surface of the light pipe having a partial frusto-conical shape.

4. The device of claim 3, wherein a longitudinal axis of the partial frusto-conical shape is parallel to the optical axis.

5. The device of claim 3, wherein the partial frusto-conical surface tapers outwardly in a direction along the optical axis.

6. The device of claim 1, wherein each of the plurality of light reflecting portions is configured to receive light from a corresponding light emitting device of the emitter and to reflect the light to travel along a corresponding radially outward and divergent path, and wherein the radially outward and divergent paths for adjacent light reflecting portions overlap.

7. The device of claim 6, wherein the corresponding radially outward and divergent path for each light reflecting portion spans an arc of 20 degrees to 180 degrees.

8. The device of claim 1, wherein the first light reflecting portion is configured to reflect light along a radially outward and divergent path that spans an arc of 20 degrees to 180 degrees.

9. The device of claim 1, wherein the plurality of light reflecting portions are arranged around an opening of the light pipe.

10. The device of claim 1, wherein the light pipe is fixed to the housing and configured to receive and transmit a switch activation force to cause actuation of a switch.

11. A device comprising:
a housing having an outer surface;
an emitter to output light in a direction along an optical axis, the emitter supported by the housing; and
a light pipe to receive light from the emitter, the light pipe including a plurality of light reflecting portions positioned between an input portion and an output portion defined by an annular ring of the light pipe, and the plurality of light reflecting portions having a continuously curved shape to reflect light in an overlapping fashion with light reflected by two other light reflecting portions,
wherein a distal end of the annular ring is positioned flush or at a same level as surrounding parts of the housing at the outer surface.

12. The device of claim 11, further comprising:
an actuator; and
wherein the light pipe is fixed to the housing and configured to receive an actuator activation force and to transmit the actuator activation force to cause the housing to move and thereby cause actuation of the actuator, and wherein the housing is configured to support the emitter and light pipe such that the emitter and light pipe move with the housing.

13. The device of claim 11, further comprising:
an actuator; and
wherein the light pipe is fixed to the housing and configured to receive an actuator activation force and to transmit the actuator activation force to cause the housing to move and thereby cause actuation of the actuator, and wherein the housing is configured to support the actuator and light pipe such that the actuator and light pipe move with the housing.

14. The device of claim 11, wherein the light pipe is configured to homogenize the light for emission from the output portion of the light pipe.

15. The device of claim 11, wherein the plurality of light reflecting portions each have surfaces with a partial frusto-conical shape.

16. The device of claim 11, wherein each of the light reflecting portions is configured to reflect the light to travel along a radially outward and divergent path.

17. The device of claim 16, wherein the light pipe is configured to reflect the light traveling along multiple radially outward divergent paths to travel in a direction along and spaced from the optical axis.

18. A device comprising:

a housing having an outer surface; and a light pipe to receive light from an emitter, the light pipe including a plurality of light reflecting portions positioned between an input portion and an output portion defined by an annular ring of the light pipe, and the plurality of light reflecting portions being multiple, planar light reflecting portions having a surface to reflect light in an overlapping fashion with light reflected by another light reflecting portion, wherein a distal end of the annular ring is positioned flush or at a same level as surrounding parts of the housing at the outer surface.

19. The device of claim 18, further comprising:

the emitter to output light in a direction along an optical axis; and an actuator;

wherein the housing supports the emitter, light pipe and actuator, wherein the light pipe is fixed to the housing and configured to receive an actuator activation force and to transmit the actuator activation force to cause the housing to move and thereby cause actuation of the actuator, and wherein the housing is configured to support the emitter and light pipe such that the emitter and light pipe move with the housing.

20. The device of claim 18, further comprising:

the emitter to output light in a direction along an optical axis; and an actuator;

wherein the housing supports the emitter, light pipe and actuator, wherein the light pipe is fixed to the housing and configured to receive an actuator activation force and to transmit the actuator activation force to cause the housing to move and thereby cause actuation of the actuator, and wherein the housing is configured to support the actuator and light pipe such that the actuator and light pipe move with the housing.

21. The device of claim 20, further comprising a user pressable button for actuation of the actuator that is located within the output portion.

22. The device of claim 18, wherein the multiple, planar light reflecting portions are arranged in a star pattern and at an opening of a disc-shaped portion of the light pipe.

23. The device of claim 18, wherein the output portion has a circular shape.

24. The device of claim 18, wherein each of the plurality of light reflecting portions includes a planar surface arranged at an angle relative to a planar surface of an adjacent light reflecting portion.

25. The device of claim 18, wherein the light pipe is configured to homogenize the light in the light pipe.

* * * * *